(12) United States Patent
Boegner et al.

(10) Patent No.: US 6,408,620 B2
(45) Date of Patent: Jun. 25, 2002

(54) EXHAUST-GAS CLEANING SYSTEM WITH NITROGEN OXIDE ACCUMULATOR CATALYST AND SULPHUR OXIDE TRAP AND OPERATING METHOD THEREFOR

(75) Inventors: Walter Boegner, Remseck; Josef Günther, Affalterbach; Hans-Peter Holzt, Esslingen; Bernd Krutzsch, Denkendorf; Stefan Renfftlen, Eislingen; Christof Schön, Remshalden; Dirk Voightländer, Korntal-Münchingen; Michel Weibel; Günter Wenninger, both of Stuttgart, all of (DE)

(73) Assignee: DaimlerChrylser AG, Stuttgart (DE)

( * ) Notice: Subject to any disclaimer, the term of this patent is extended or adjusted under 35 U.S.C. 154(b) by 0 days.

(21) Appl. No.: 09/736,418

(22) Filed: Dec. 15, 2000

(30) Foreign Application Priority Data

Dec. 15, 1999 (DE) .......................... 199 60 430

(51) Int. Cl.⁷ ................................................ F01N 3/00
(52) U.S. Cl. .............................. 60/295; 60/289; 60/292; 60/287; 60/297
(58) Field of Search .......................... 60/285, 286, 287, 60/288, 289, 291, 292, 295, 297, 301, 274, 324

(56) References Cited

U.S. PATENT DOCUMENTS

| | | | | |
|---|---|---|---|---|
| 5,398,503 A | * | 3/1995 | Danno et al. | ................. 60/288 |
| 5,974,788 A | * | 11/1999 | Hepburn et al. | ............... 60/274 |
| 6,014,859 A | * | 1/2000 | Yoshizaki et al. | ............. 60/285 |
| 6,058,700 A | * | 5/2000 | Yamashita et al. | ............. 60/285 |
| 6,212,885 B1 | * | 4/2001 | Hirota et al. | .................. 60/288 |
| 6,233,925 B1 | * | 5/2001 | Hirota et al. | .................. 60/285 |
| 6,233,927 B1 | * | 5/2001 | Hirota et al. | .................. 60/297 |

FOREIGN PATENT DOCUMENTS

| | | |
|---|---|---|
| DE | 197 47 222 | 3/1999 |
| DE | 198 02 631 | 7/1999 |
| DE | 199 22 962 | 11/2000 |

* cited by examiner

Primary Examiner—Thomas Denion
Assistant Examiner—Binh Tran
(74) Attorney, Agent, or Firm—Crowell & Moring LLP

(57) ABSTRACT

A method for operating an exhaust-gas cleaning system having an $NO_x$ adsorption accumulator and an $SO_x$ trap, includes, in normal operating phases, feeding the exhaust gas to be cleaned first via the $SO_x$ trap and then via the $NO_x$ adsorption accumulator. The normal operating phases are from time to time interrupted by desulphurization phases for desulphurizing the $SO_x$ trap. Means are provided for controlling the direction of flow of the exhaust stream so that it optionally passes firstly via the $SO_x$ trap and then via the $NO_x$ adsorption accumulator, or firstly via the $NO_x$ adsorption accumulator and then via the $SO_x$ trap, so that during the desulphurization phases the exhaust gas can be passed firstly via the $NO_x$ adsorption accumulator and then via the $SO_x$ trap.

5 Claims, 1 Drawing Sheet

EXHAUST-GAS CLEANING SYSTEM WITH NITROGEN OXIDE ACCUMULATOR CATALYST AND SULPHUR OXIDE TRAP AND OPERATING METHOD THEREFOR

BACKGROUND AND SUMMARY OF INVENTION

This application claims the priority of German application No. 199 60 430.4, filed Dec. 15, 1999, the disclosure of which is expressly incorporated by reference herein.

The present invention relates to a method for operating an exhaust-gas cleaning system which comprises a nitrogen oxide adsorption accumulator and a sulphur oxide trap and to an exhaust-gas cleaning system which can be operated using this method.

Exhaust-gas cleaning systems with a nitrogen oxide ($NO_x$) adsorption accumulator, such as an $NO_x$ adsorber catalytic converter, are used in particular in motor vehicles with an internal-combustion engine in order to minimize the nitrogen oxide emissions. In operating phases involving conditions which are unfavourable to nitrogen oxide reduction, such as in lean-burn mode, it is known for nitrogen oxide to be temporarily stored in the $NO_x$ accumulator by an adsorption process. This stored nitrogen oxide can then be converted back to nitrogen in a suitable subsequent reduction operating phase, such as in rich-burn mode. The terms lean-burn and rich-burn mode are understood to mean operation with oxygen-rich and low-oxygen exhaust-gas composition, respectively, for example as a result of an engine being operated with a lean or rich engine air ratio (i.e., with an air/fuel ratio for the air/fuel mixture burnt in the engine which is above or below the stoichiometric value).

The $SO_x$ trap prevents sulphur poisoning of the $NO_x$ adsorber. This is because, particularly when the engine is in lean-burn mode, sulphur which is contained in standard fuels and engine oils leads to sulphur dioxide being present in the exhaust gas. The sulphur dioxide is taken up by the $NO_x$ adsorber as a result of sulphates being formed, thereby reducing the capacity of this adsorber to store $NO_x$. The $SO_x$ trap prevents this by trapping the sulphur oxides before they reach the $NO_x$ adsorption accumulator. It is subjected to a desulphurization treatment at the latest when its $SO_x$ storage capacity is exhausted. To achieve effective desulphurization, it is known to set elevated exhaust-gas temperatures of, for example, over 600° C. and a rich exhaust air ratio, i.e. a ratio which is below the stoichiometric level.

A further special method for periodically desulphurizing a nitrogen oxide or sulphur oxide accumulator of an exhaust-gas cleaning system using secondary-air supply means is described in German patent application 199 22 962. In this method, during part of the desulphurization period, the exhaust-gas cleaning system is operated in such a way that, after a predeterminable desulphurization temperature has been reached, the accumulator air ratio (i.e., the air ratio in the exhaust gas supplied to the accumulator which is to be desulphurized), is made to oscillate between an oxidizing atmosphere, on the one hand, and a reducing atmosphere, on the other hand, by correspondingly changing the amount of secondary air supplied.

Patent DE 197 47 222 C1 describes a method for operating an exhaust-gas cleaning system in which on demand, from time to time, an $NO_x$ accumulator catalytic converter is desulphurized, i.e., accumulated sulphate is removed. The exhaust-gas cleaning system comprises secondary-air supply means having a secondary-air line and a secondary-air pump which can be controlled, for example, by an engine management system.

A problem with the conventional periodic regeneration of the $SO_x$ trap is that the $NO_x$ accumulator catalytic converter which follows it is exposed to the sulphur components released from the $SO_x$ trap, and in unfavourable circumstances this may lead to its ability to store $NO_x$ being partially blocked by the accumulation of sulphates. DE 198 02 631 A1 discloses an exhaust-gas cleaning system in which this problem is combatted by providing a bypass around the $NO_x$ accumulator catalytic converter in the exhaust system, via which bypass the exhaust gas is guided past the $NO_x$ accumulator catalytic converter while the $SO_x$ accumulator catalytic converter is desulphurized.

The present invention is based on the technical problem of providing an exhaust-gas cleaning system and an operating method which enable the $SO_x$ trap to be desulphurized with the minimum possible outlay and without there being any risk of sulphur poisoning of the nitrogen oxide accumulator catalytic converter.

In the method according to the present invention, the direction of flow of the exhaust gas during the desulphurizing phases is selected to be different from during the normal operating phases. During the normal operating phases, the exhaust gas which is to be cleaned is passed firstly via the $SO_x$ trap and then via the $NO_x$ adsorption accumulator. The sulphur oxide constituents of the exhaust gas, which are undesirable in the nitrogen oxide adsorption accumulator, remain trapped in the $SO_x$ trap, provided that the storage capacity of the $SO_x$ trap has not yet been exhausted and there is as yet no saturation behaviour. If the desulphurization phase is selected, the exhaust-gas flow is switched over in such a way that it passes through the two exhaust-gas cleaning components, namely the $SO_x$ trap and $NO_x$ adsorption accumulator, in the reverse direction (i.e., is passed firstly via the $NO_x$ adsorption accumulator and then via the $SO_x$ trap). This prevents sulphur compounds released during the desulphurization of the $SO_x$ trap from polluting the $NO_x$ adsorption accumulator.

In an embodiment of the present invention, secondary air is fed into the exhaust gas downstream of the $SO_x$ trap during the desulphurization phase. The secondary air is used to oxidize undesirable sulphur compounds, such as $H_2S$ and COS, which are released in the $SO_x$ trap, for which purpose an oxidation catalytic converter is connected downstream of the $SO_x$ trap.

An exhaust-gas cleaning system is equipped with an $SO_x$ trap and an $NO_x$ adsorption accumulator and can be operated according to the present invention. For this purpose, it has means for reversing the direction of flow of the exhaust gas in such a manner that the exhaust-gas stream can optionally be passed firstly through the $SO_x$ trap and then through the $NO_x$ adsorption accumulator or, conversely, firstly through the $NO_x$ adsorption accumulator and then through the $SO_x$ trap.

A configuration of the exhaust-gas cleaning system according to the present invention provides, as further components, an oxidation catalytic converter and secondary-air supply means.

Other objects, advantages and novel features of the present invention will become apparent from the following detailed description of the invention when considered in conjunction with the accompanying drawings.

DETAILED DESCRIPTION OF THE DRAWINGS

Figure 1:
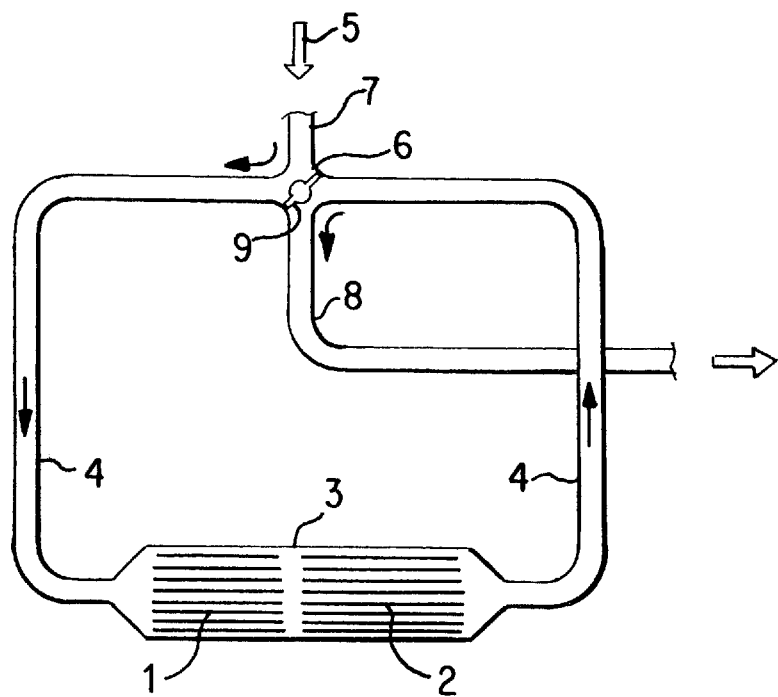
FIG. 1 depicts an exhaust-gas cleaning system in a normal operating phase.
Figure 2:
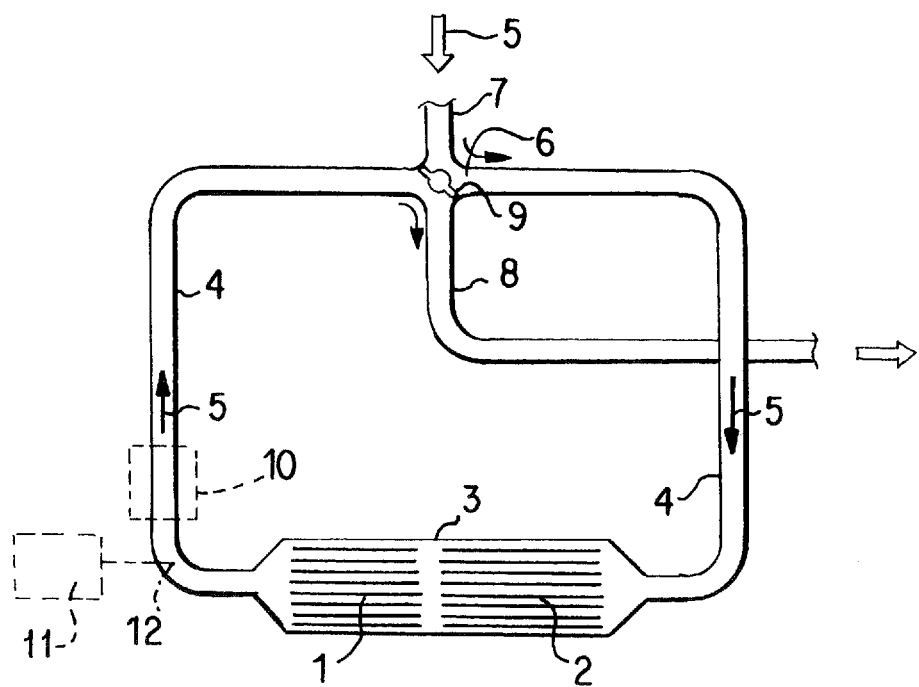
FIG. 2 depicts the exhaust-gas cleaning system from FIG. 1 in a desulphurization operating phase.

FIG. 1 and 2 diagrammatically depict a part of an exhaust-gas cleaning system which is of interest in the context of the present invention, having an $SO_x$ trap 1, which is also referred to as an $SO_x$ accumulator catalytic converter, and a catalytically active nitrogen oxide adsorber, i.e., an $NO_x$ accumulator catalytic converter 2. In the example shown, the $SO_x$ trap 1 and the $NO_x$ accumulator catalytic converter 2 are connected in series in a common housing 3 which is arranged in an associated section 4 of an exhaust system which carries the exhaust gas 5 which is to be cleaned. Alternatively, the two exhaust-gas cleaning components 1, 2 may be arranged in separate housings but in series in the exhaust-gas system section 4.

The exhaust-gas cleaning system shown has means for reversing the direction of flow of the exhaust gas flowing through the exhaust system section 4 in which the $SO_x$ trap 1 and the $NO_x$ accumulator catalytic converter 2 are arranged. These means include a branching junction 6, at which the two connections of the exhaust system section 4 which includes the $SO_x$ trap 1 and the $NO_x$ accumulator catalytic converter 2 meet an exhaust-gas supply line 7 and an exhaust-gas discharge line 8. In the branching junction 6 there is a controllable flap 9 which can be switched between a normal operating position shown in FIG. 1 and a desulphurization position shown in FIG. 2.

In the normal operating position shown in FIG. 1, the SE flap 9 passes the exhaust gas supplied by the supply line 7 into the left-hand part, as seen in FIG. 1, of the exhaust system section 4, so that in that section it firstly flows via the $SO_x$ trap 1 and then via the $NO_x$ accumulator catalytic converter 2, from where it returns to the branching junction 6 and, through the flow-guiding effect of the flap 9, is passed into the discharge line 8. In its position shown in FIG. 2, by contrast, the flap 9 passes the supplied exhaust gas into the right-hand part of the exhaust system section 4 which includes the two exhaust-gas cleaning components 1, 2, so that the exhaust gas flows firstly via the $NO_x$ accumulator catalytic converter 2 and then via the $SO_x$ trap 1, from where it returns to the branching junction 6 and, in turn, is passed into the discharge line 8 under the action of the flap 9.

As an alternative to the flap 9, it is possible to use any other conventional flow-guiding means which can be switched between two positions in order: in one position, to guide the exhaust gas in one direction and, in the other position, to guide the exhaust gas in the other direction through the exhaust system section 4 which includes the $SO_x$ trap 1 and the $NO_x$ accumulator catalytic converter 2 (e.g., a corresponding four-way valve or a suitable slide or opener element). Furthermore, it will be understood that, depending on the particular requirements, further exhaust-gas cleaning components, in particular further catalytic converter bodies, may be provided in addition to the exhaust-gas cleaning components shown in the present case, for example a three-way catalytic converter or a nitrogen oxide reduction catalytic converter may be provided in the exhaust-gas discharge line 8. The exhaust-gas cleaning system which has been constructed in this way and is suitable in particular for cleaning the exhaust gases from a spark-ignition or diesel engine of a motor vehicle, allows the following advantageous method of operation.

During so-called normal operating phases, the flap 9 is set into its normal operating position shown in FIG. 1. The exhaust gas 5 which is to be cleaned then firstly reaches the $SO_x$ trap 1, which adsorbs any sulphur compounds which are contained in the exhaust gas, after which the exhaust gas from which the sulphur has been removed is fed to the $NO_x$ accumulator catalytic converter 2. The function of the $NO_x$ accumulator catalytic converter then differs according to whether, during the normal operating phase, it is being run in adsorption mode or in description mode. In the adsorption mode, the $NO_x$ accumulator catalytic converter 2 adsorbs nitrogen oxides contained in the exhaust gas, while in description mode it releases the nitrogen oxides which have been adsorbed and temporarily stored again, and these nitrogen oxides are then reduced to form nitrogen, for which purpose the $NO_x$ accumulator catalytic converter 2 can simultaneously act as a nitrogen oxide reduction catalytic converter, or a catalytic converter of this type may be connected downstream as a separate catalytic converter body, as is standard procedure for the person skilled in the art. It is known the $NO_x$ accumulator catalytic converter 2 is preferably operated as long as possible in adsorption mode, during which the exhaust gas may be of lean composition, until the $NO_x$ accumulator catalytic converter 2 has reached a certain level of loading, after which the accumulated nitrogen oxides are released again during a short description phase. The description operation is known to generally include the setting of a rich exhaust-gas composition, for example by suitably altering the air/fuel mixture which is burnt by the combustion device generating the exhaust gas and/or by injecting a reducing agent, such as ammonia, into the exhaust gas upstream of the $NO_x$ accumulator catalytic converter 2.

Therefore, during normal operation outlined above, the $SO_x$ trap 1 is positioned upstream of the $NO_x$ accumulator catalytic converter 2 and prevents sulphur poisoning of the latter. If, after a prolonged period of normal operation, the $SO_x$ trap 1 has reached a certain degree of saturation, normal operation is interrupted by a so-called desulphurization phase. For this purpose, the flap 9 is moved into its desulphurization position shown in FIG. 2, with the result that the incoming exhaust gas is then passed firstly via the $NO_x$ accumulator catalytic converter 2 and only then into the $SO_x$ trap 1. Moreover, the standard desulphurization conditions are established, with regard, for example, to composition and temperature of the exhaust-gas stream. If, despite the $SO_x$ trap 1, some sulphur has been accumulated in the $NO_x$ accumulator catalytic converter 2, this sulphur is also removed during the desulphurization operation. The desulphurization operation releases the sulphur which has been accumulated in sulphate form in the $SO_x$ trap 1, so that the ability of this trap to take up sulphur is restored.

The reversal of flow of the exhaust gas in the exhaust system section 4 during the desulphurization phase with respect to the direction of flow of the exhaust gas in normal operation means that the exhaust gas which leaves the $SO_x$ trap 1 during the desulphurization operation and contains the released sulphur or corresponding sulphur compounds does not enter the $NO_x$ accumulator catalytic converter 2. This prevents the possibility of sulphur which is released in the $SO_x$ trap 1 during the desulphurization from being accumulated in the $NO_x$ accumulator catalytic converter 2.

Since emission of the sulphur compounds, such as $H_2S$ and/or COS, which enter the exhaust gas during the desulphurization of the $SO_x$ trap 1 to the environment is generally undesirable, it is possible to provide an oxidation catalytic converter 10 as one possible remedy. This oxidation catalytic converter is arranged downstream of the $SO_x$ trap 1, as seen in the direction of flow of the exhaust gas during n desulphurization, in the same exhaust system section 4, as indicated by dashed lines in FIG. 2, or in the adjoining exhaust-gas discharge line 8. To enable the problematical sulphur compounds to be converted optimally in the oxidation catalytic converter 10 despite the fact that the composition of the exhaust gas supplied in the oxidation catalytic converter 10 is generally selected to be rich for the desulphurization of the $SO_x$ trap 1, for this situation secondary-air supply means 11 of conventional type are additionally provided, as diagrammatically indicated by dashed lines in FIG. 2. At a secondary-air inlet point 12 which lies between the $SO_x$ trap 1 and the oxidation catalytic converter 10, the secondary-air supply means 11 feed air into the exhaust system section 4 during a desulphurization operation. As a result, sufficient oxygen to convert the sulphur compounds which have been released is admixed with the exhaust gas flowing to the oxidation catalytic converter 10.

It will be understood that, to control operation of the exhaust-gas cleaning system, a suitably designed control unit (not shown) is provided, which, for example, may simultaneously be used to control the combustion device which generates the exhaust gas, a measure which is inherently common to the person skilled in the art and therefore requires no further explanation.

It is clear from the above explanation of an advantageous example that the operating method according to the present invention and the exhaust-gas cleaning system according to the present invention are suitable for cleaning exhaust gases not only from a motor vehicle engine but also from a stationary combustion device. The exhaust-gas cleaning allows periodic adsorption and description of an $NO_x$ adsorption accumulator; protection for the $NO_x$ adsorption accumulator from sulphur poisoning by an associated $SO_x$ trap; and periodic desulphurization of the $SO_x$ trap without the $NO_x$ adsorption accumulator being exposed to sulphur compounds which are released.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for operating an exhaust-gas cleaning system comprising an $NO_x$ adsorption accumulator and an $SO_x$ trap, said method comprising:

in a normal operating phase, passing an exhaust gas first through the $SO_x$ trap and then through the $NO_x$ adsorption accumulator; and interrupting the normal operating phase from time to time by desulphurization phases for desulphurizing the $SO_x$ traps wherein a desulphurization phase comprises:

passing the exhaust gas first through the $NO_x$ adsorption accumulator and then through the $SO_x$ trap;

feeding secondary air into the exhaust gas downstream of the $SO_x$ trap; and feeding the exhaust gas that is enriched with secondary air to an oxidation catalytic converter.

2. A method for operating an exhaust-gas cleaning system comprising an $NO_x$ adsorption accumulator and an $SO_x$ trap, said method comprising:

passing an exhaust gas first through the $SO_x$ trap and then through the $NO_x$ adsorption accumulator during a lean phase operation of the system;

passing the exhaust gas first through the $NO_x$ adsorption accumulator and then through the $SO_x$ trap during a desulphurization phase for desulphurizing the $SO_x$ trap; and during the desulphurization phase, feeding secondary air into the exhaust gas downstream of the $SO_x$ trap and feeding the exhaust gas that is enriched with secondary air to an oxidation catalytic converter.

3. An exhaust-gas cleaning system, comprising:

at least one $SO_x$ trap;

at least one $NO_x$ adsorption accumulator arranged in series with the at least one $SO_x$ trap in an exhaust system;

an oxidation catalytic converter arranged on the opposite side of the $SO_x$ trap from the $NO_x$ adsorption accumulator;

a secondary-air supply device that opens into the exhaust system between the $SO_x$ trap and the oxidation catalytic converter; and means for controlling the direction of exhaust gas flow so that it passes first through the $SO_x$ trap and then through the $NO_x$ adsorption accumulator or first through the $NO_x$ adsorption accumulator and then through the $SO_x$ trap.

4. An exhaust-gas cleaning system according to claim 3, wherein said means for controlling the direction of the exhaust gas flow comprises a flap, a valve, or a slide.

5. A motor vehicle internal-combustion engine comprising the exhaust-gas cleaning system of claim 3.

* * * * *